United States Patent [19]

Ichikawa et al.

[11] 4,070,681
[45] Jan. 24, 1978

[54] MODULATED LASER

[75] Inventors: Jyunji Ichikawa, Kawasaki; Takehiko Kiyohara, Zama; Noboru Koumura; Koichi Kadokura, both of Tokyo; Takashi Nakano, Yokohama, all of Japan

[73] Assignee: Canon Kabushiki Kaisha, Tokyo, Japan

[21] Appl. No.: 618,153

[22] Filed: Sept. 30, 1975

[30] Foreign Application Priority Data

Feb. 7, 1975  Japan .................................. 50-16096

[51] Int. Cl.² ...................... G03G 15/04; H01S 3/111
[52] U.S. Cl. .................................. 346/160; 332/7.51; 350/273
[58] Field of Search ............................... 346/153, 160; 178/6.6 A; 332/7.51; 350/266, 269, 273, 271, 219; 356/138, 153

[56] References Cited

U.S. PATENT DOCUMENTS

| | | | |
|---|---|---|---|
| 3,537,777 | 11/1970 | Flynn ................................... | 350/271 |
| 3,720,785 | 3/1973 | Van Auken ....................... | 346/74 P |
| 3,750,189 | 7/1973 | Fleischer .......................... | 346/74 P |
| 3,871,771 | 3/1975 | Scott .................................. | 356/138 |
| 3,881,107 | 4/1975 | Bory .................................... | 356/138 |
| 3,890,033 | 6/1975 | McGee ............................... | 350/271 |
| 3,966,327 | 6/1976 | Hanson .............................. | 356/138 |

OTHER PUBLICATIONS

Xerox Disc. Journal, vol. 1, #1, Jan. 1976, "Scanning System for Imaging . . .", Starkweather, p. 97.

*Primary Examiner*—Jay P. Lucas
*Attorney, Agent, or Firm*—Fitzpatrick, Cella, Harper & Scinto

[57] ABSTRACT

In an image information recording apparatus which comprises a laser oscillator, means for deflecting and modulating the laser beam from the laser oscillator by an external signal, a recording medium, optical means for imaging the modulated laser beam on the recording medium and means for causing the laser beam to scan over the recording medium, the light path of the laser beam is divided into a plurality of light path sections and partition plates are provided before and behind each of the light path sections and have holes formed at the portions thereof corresponding to the center of the optical axis. Thus, the optical axis in the apparatus may be adjusted by passing the laser beam through the center of the holes in the partition plates.

19 Claims, 18 Drawing Figures

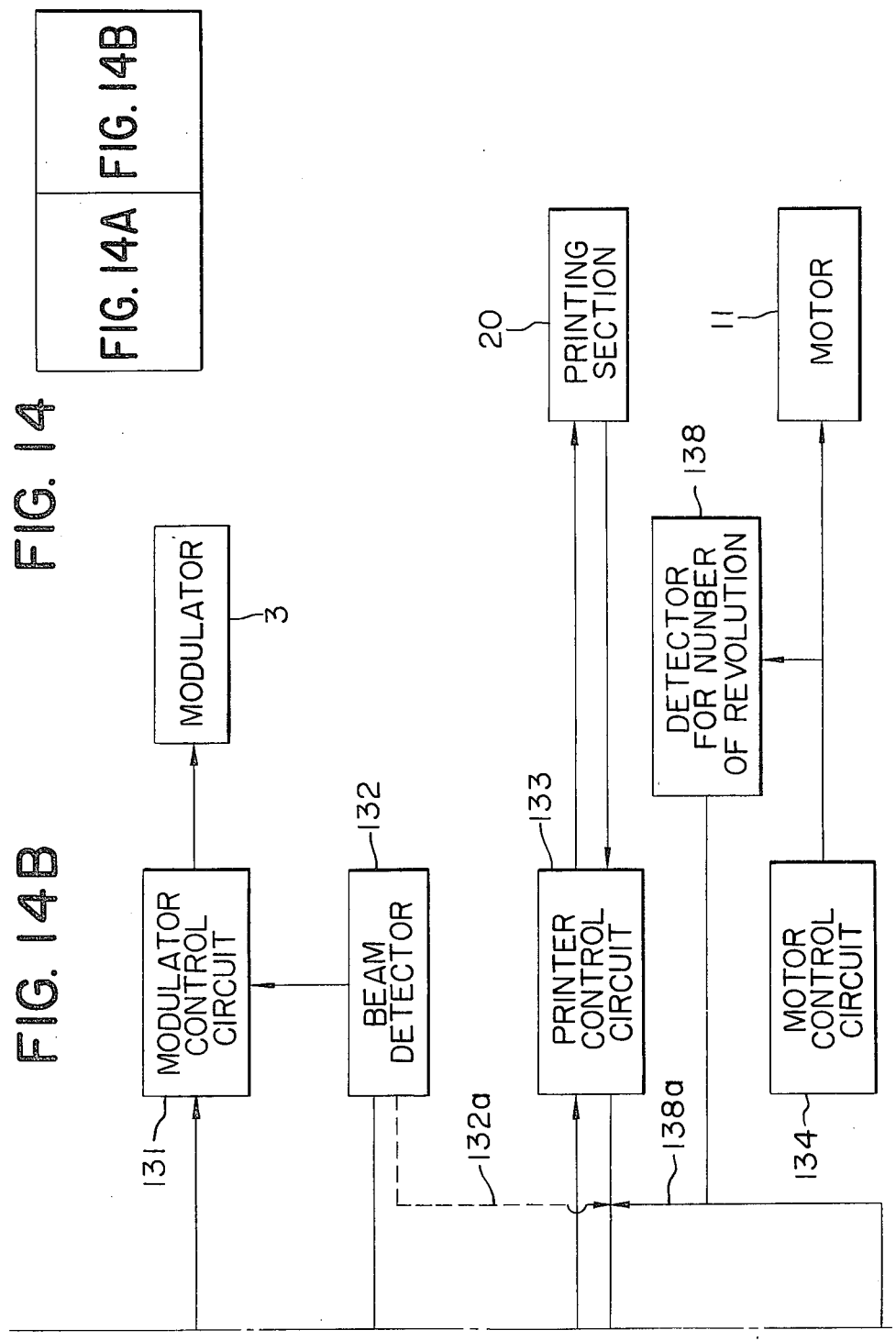

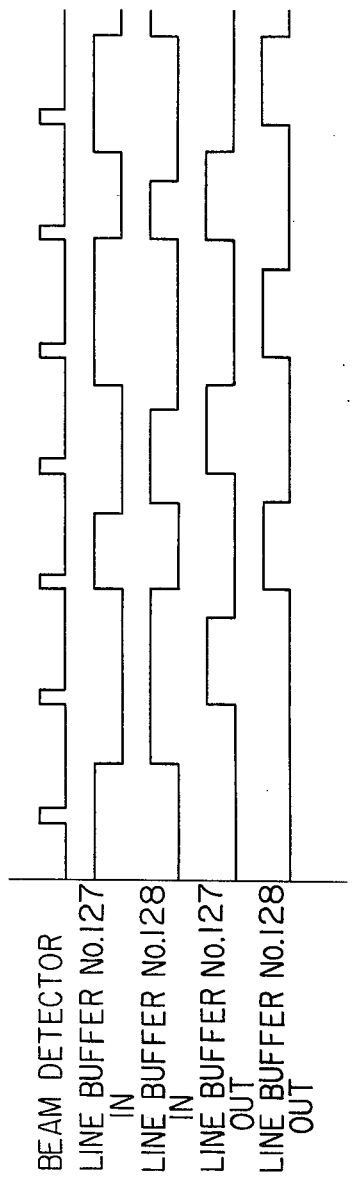

MODULATED LASER

BACKGROUND OF THE INVENTION

1. Field of the Invention

This invention relates to a small-sized recording apparatus which is capable of reproducing at a high speed image information such as characters or patterns from an electronic computer, a facsimile image transmitter, etc., and, more particularly, to an apparatus which forms a light image by modulating, deflecting, and controlling a laser beam in accordance with such image information, and which reproduces, as an output, high quality hard copies at a high speed by applying the image transfer type electrophotographic method.

2. Description of the Prior Art

Recent trends toward high performance of electronic computers has given rise to the need for development of high-speed and high-quality output units for image information such as patterns, characters, etc.. As the exclusive apparatus for outputting character information at a high speed, there have heretofore been known mechanical impact line printers of a drum type, multi-stylus electrostatic printers, CRT printers comprising a combination of CRT (chiefly OFT) and electrophotographic method.

However, the mechanical impact line printers are limited in speed, and have such disadvantages as tremendous noise from mechanical parts, and poor reliability in operation, and so on.

The multi-stylus electrostatic printers are limited in resolving power, and have the disadvantage that expensive electrostatic recording paper must be used as the recording material.

With the CRT printers, it is difficult to maintain a high quality printing condition for a long period of time owing to stability of the CRT driver circuit, and the entire apparatus becomes disadvantageously bulky due to the large size of the CRT.

Thus, the pattern or character output units of the conventional system have encountered various problems in outputting characters (particularly Chinese characters) at high speed with good reproducing quality. Further, as the units for outputting pattern information alone, there have been mechanical X-Y plotters, drafters, multi-stylus electrostatic plotters, CRT plotters which optically record the pattern information displayed on a displaying CRT. However, the mechanical X-Y plotters and drafters are disadvantageous in their very slow recording speed, the multi-stylus electrostatic plotters are disadvantageous in their low resolving power and in their use of special recording paper which is expensive, and the CRT plotters are also disadvantageous in their low resolving power of the CRT itself, poor stability and deficient quantity of light.

SUMMARY OF THE INVENTION

The present invention intends to overcome the above-noted various disadvantages inherent in the prior art devices, and to provide a highly compact apparatus which can record, at a high speed and on plain paper, image information such as patterns, characters, etc. from an electronic computer, a facsimile image transmitter, etc. to thereby produce high quality hard copies.

It is also an object of the present invention to provide, in particular, a method of adjusting the optical axis in an image information recording apparatus having means for deflecting and modulating the laser beam from a laser oscillator by an external signal, and, in which the deflected and modulated laser beam scans over a sensitive medium to thereby accomplish image recording.

It is another object of the present invention to provide an image information recording apparatus, wherein the light path of the laser beam is divided into a plurality of light path sections, in the front and rear faces of which there are provided partition plates, each having a hole formed at a portion thereof corresponding to the center of the optical axis, whereby adjustment of the optical axis can be done easily by passing the laser beam through the center of the holes in the partition plates.

It is still another object of the present invention to provide an image information recording apparatus, wherein caps insertable into the holes in the partition plates are provided, and a target indicating the center of the optical axis is provided on the front face of each cap so that the optical axis may be adjusted by applying the laser beam to the target.

It is other object of the present invention to provide an image information recording apparatus, wherein an aperture of a small diameter is formed in the front face of each of the caps at a portion thereof corresponding to the center of the optical axis, and a photoelectric member sensitive to the laser beam passed through the aperture is provided on the rear face of the cap, whereby adjustment of the optical axis is effected by the output of the photoelectric member.

It is still other object of the present invention to provide image information recording apparatus, wherein the diameter of the hole in each of the partition plates coincides with the required diameter of the laser beam to thereby improve the parallelism of the laser beam and to facilitate the adjustment of the optical axis.

It is a further object of the present invention to provide image information recording apparatus, wherein each of the above-mentioned light path sections of the laser beam is covered by a plurality of box-shaped members to prevent the human body from being hurt by the laser beam during handling of the apparatus, and also means is provided to interrupt or attenuate the projection of the laser beam by a signal associated with the opening and closure of a part of the box-shaped members, for the purpose of which a shutter and other expedients are provided to carry out cutting off of the power source for the laser oscillator, or interruption or attenuation of the laser beam output in the deflector-modulator means, or interception of the laser beam.

It is a still further object of the present invention to provide image information recording apparatus, wherein means for detecting any abnormality in the operation of the scanning means is provided to ensure safety against accidents by causing stoppage of the scanning function of the laser beam by interrupting the the laser beam as by the above-described method.

It is an additional object of the present invention to provide image information recording means, wherein means for detecting the laser beam output is provided to maintain the laser beam output above a certain definite level to ensure satisfactory recording of image information, the output of which enables the recording operation to start.

It is still another object of the present invention to provide an image information recording device, wherein a part of the apparatus is divided, along the path of the laser beam, into an optical functioning section and a recording section, both of which are combined into a cubical housing arrangement to thereby enable the apparatus size to be compact.

The above objects and other features of the present invention will become more fully apparent from the following detailed description of some preferred embodiments thereof, when taken in conjunction with the accompanying drawings.

BRIEF DESCRIPTION OF THE DRAWINGS

FIG. 15 is an illustration of the waveform in each section of FIG. 14, respectively.

DESCRIPTION OF THE PREFERRED EMBODIMENTS

Figure 1:
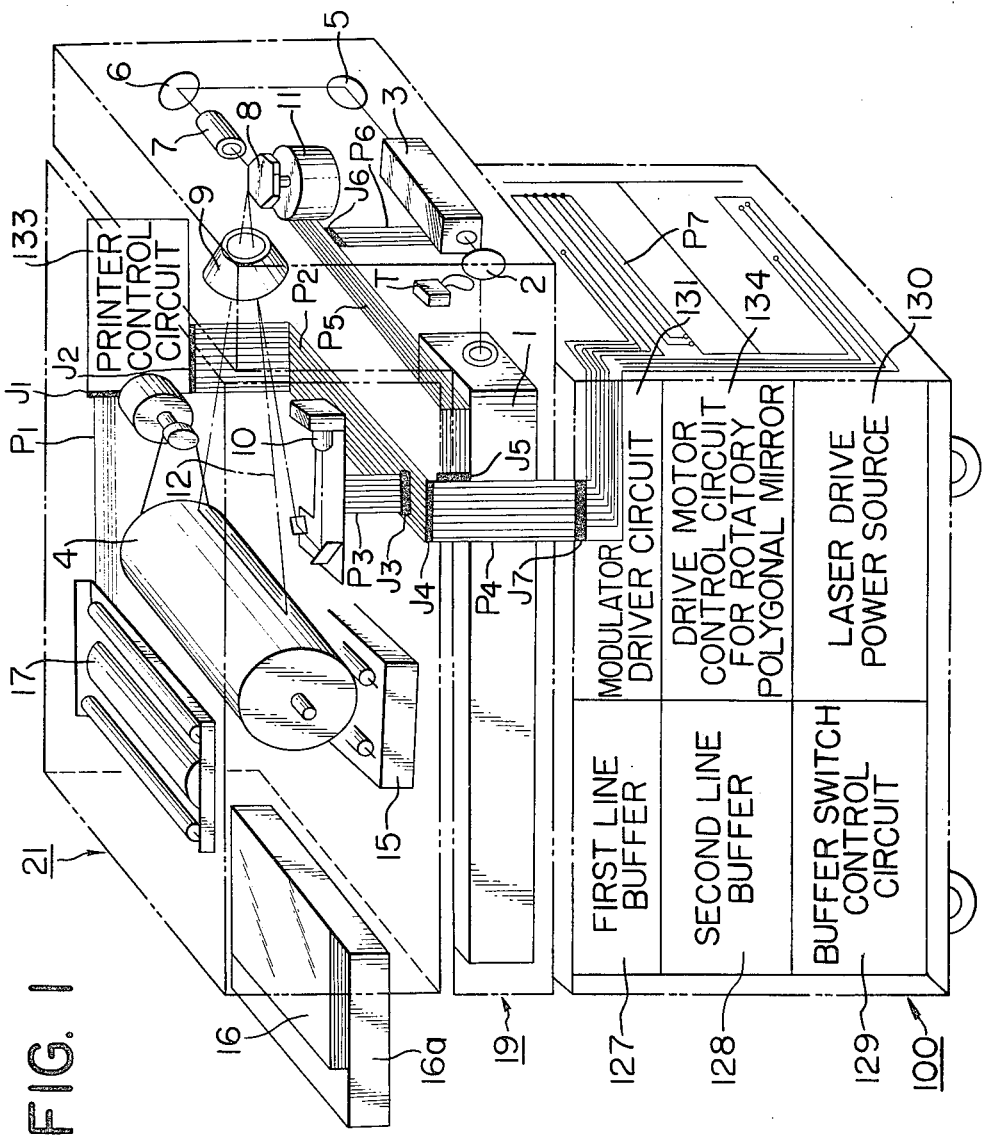
FIG. 1 is a three-dimensional representation of the basic construction according to an embodiment of the present invention.

The invention will hereinafter be described in detail with respect to some embodiments thereof shown in the drawings. FIG. 1 three-dimensionally illustrates a basic construction of the present invention.

OPTICAL SYSTEM AND ITS ARRANGEMENT

A laser beam oscillated by a laser oscillator 1 disposed below a photosensitive drum 4 for electrophotography is directed through a reflecting optical system or element 2 to the input opening of a modulator 3. The reflecting optical system 2 is inserted for the purpose of horizontally bending the light path to reduce the space occupied by the apparatus and also for the purpose of adjusting the optical axis of the laser beam to the input opening of the modulator 3, and if not necessary, may be eliminated. The modulator 3 may be a conventional acousto-optic modulator element utilizing the acousto-optic effect, a conventional electro-optic element utilizing the electro-optic effect, or similar element. In the modulator 3, the laser beam undergoes strong or weak modulation in accordance with an extraneous input signal to the modulator 3. The modulator 3 may be omitted if the laser oscillator 1 is of the type by which current modulation is feasible in a semiconductor laser or a gas laser or of the internal modulation type which has a modulator element incorporated in an oscillating optical path. The laser beam from the modulator 3 is bent in the vertical direction by a reflecting optical system 5 and further bent in horizontal direction by a reflecting optical system or element 6 so as to reach a beam expander system 7. Since the reflecting optical systems 2, 5 and 6 are movable in either the X or Y direction and their reflecting surfaces are rotatable, it is possible to cause the laser beam to enter the beam expander 7 along the optical axis thereof by adjusting the positions of the reflecting systems 5 and 6 independently of each other in whatever direction the beam may emerge from the modulator 3. The laser beam has its beam diameter enlarged by the beam expander 7 while it remains a parallel beam. The laser beam with its diameter so enlarged is caused to impinge upon a scanning means such as a polygonal rotatable mirror 8 having one or more mirror surfaces. The polygonal rotatable mirror 8 is mounted on a shaft supported by a high precision bearing (for example, a pneumatic bearing) and may be driven from a constant speed motor 11 (such as a hysteresis synchronous motor or DC servomotor). The scanning means, however, is not restricted to the polygonal rotatable mirror or the like. As the laser beam emerges from the beam expander 7, it is horizontally swept by the polygonal rotatable mirror 8. The laser beam deflected by the polygonal rotatable mirror 8 is imaged as a spot on the photosensitive drum 4 by an image-forming lens 9 having $f - \theta$ characteristics as defined hereinafter.

In the ordinary image forming lens, if the angle of incidence of the light ray is $\theta$, the position $r$ at which the light ray is imaged on the image plane is defined by the relation:

$$r = f \cdot \tan \theta \ldots \quad (1),$$

where $f$ is the focal length of the image forming lens. The laser beam reflected by the polygonal rotatable mirror 8 rotating at a constant speed, as in the present embodiment, has its angle of incidence on the image forming lens 9 varied with time in accordance with equation (1) alone. Thus, the velocity of movement of the light spot imaged on the photosensitive drum 4 which is the image plane is non-linearly varied and not constant. That is, the velocity of movement of the light spot is increased at a point where the angle of incidence is greater. Therefore, if the laser beam is turned on at predetermined time intervals to depict a row of spots on the photosensitive drum 4, the space intervals between these spots will be wider at the opposite ends of the row than in the middle. To avoid such a phenomenon, the image forming lens 9 is designed to have a characteristic as shown below.

$$r = f \cdot \theta \ldots \quad (2)$$

Such an image forming lens 9 will hereinafter be referred to as $f - \theta$ lens.

Further, when a parallel light beam is imaged in the form of a spot by an image forming lens, the minimum diameter $d_{min}$ of the spot is given thus:

$$d_{min} = K \cdot f \frac{\lambda}{A} \ldots \quad (3)$$

where $f$ is the focal length of the image forming lens, $\lambda$ the wavelength of the light in use, A the incidence aperture of the image forming lens, and K a constant. Thus, if $f$ and $\lambda$ are constant, a smaller spot diameter $d_{min}$ may be obtained by increasing A. The beam expander 7 is employed to provide such effect. Therefore, the beam expander 7 may be omitted if the necessary $d_{min}$ can be obtained by the beam diameter of the laser oscillator.

A beam detector 10 comprises two mirrors, a small incidence slit, and a quickly responsive photoelectric converter element (for example, a PIN diode). The beam detector 10 detects the position of the laser beam 12 as it is swept and the detection signal produced thereby determines the timing for starting the input signal to the modulator 3 for imparting desired light information onto the photosensitive drum. By this, the mis-synchronization of horizontal signals due to the error in the division precision of each reflecting surface of the polygonal rotatable mirror and the irregular rotation of the mirror may be greatly reduced to ensure production of images of good quality, and also the precision tolerances required for the polygonal rotatable mirror 8 and the drive motor 11 may be greater to permit a lower cost of manufacture.

The laser beam 12 deflected and modulated as described above is projected upon the photosensitive drum 4 to form thereon a latent image, which is developed into a visible image through the electrophotographic treating process and thereafter, transferred and fixed onto plain paper to produce a hard copy. Of course, the present embodiment is also applicable to the electrofax type electrophotographic method.

Figure 2:
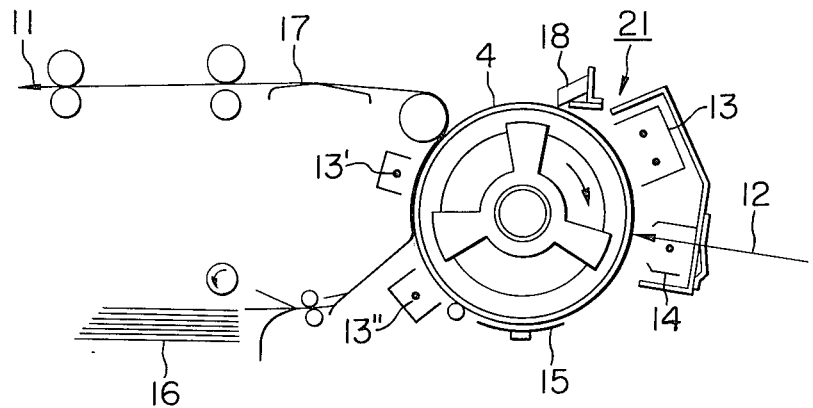
FIG. 2 schematically shows the construction of the printing section in the same embodiment.

Reference will now be had to FIG. 2 to describe a printing section 21.

Any of the well-known electrophotographic processes may be used with the present embodiment and as an example, use may be made of the process as disclosed in Japanese Pat. Publication No. 23910/1967 corresponding to U.S. Pat. No. 3,666,363 wherein the surface of the insulating layer of the photosensitive drum 4 basically comprising a conductive base, a photoconductive layer and an insulating layer which is uniformly pre-charged to the positive or the negative polarity by a first corona charger 13 to cause charge opposite in polarity to said pre-charge to be captured in the interface between the photoconductive layer and the insulating layer or in the interior of the photoconductive layer, whereafter the laser beam 12 is directed upon the charged insulating layer surface as the latter is subjected to AC corona charge by an AC corona charger 14, to thereby form on the insulating layer surface a pattern resulting from a surface potential difference produced in accordance with the light-and-dark pattern of the laser beam 12; and then the entire insulating layer surface is uniformly exposed to light to cause an electrostatic image with high contrast to be formed on the insulating layer surface; the electrostatic image is developed into a visible image by a developing device 15 using a developer consisting chiefly of charged toner particles, whereafter the visible image is passed through pre-charge means 13" and transferred onto paper or like transfer medium 16 by transfer means such as a corona discharger 13' and through utilization of an internal or external field or the like; and then the transferred image is fixed by fixing means 17 using an infrared ray lamp, a hot plate or the like to thereby provide an electrophotographically printed image; on the other hand, after the image transfer, the insulating layer surface is cleaned by a cleaning device 18 to remove any residual charged particles to make the photosensitive drum 4 ready for reuse.

The mechanical construction and arrangement of the first embodiment will now be explained with reference to FIGS. 1 and 3.

MECHANICAL CONSTRUCTION AND ARRANGEMENT

A carriage 19 mounting thereon the laser oscillator 1, the modulator 3, the optical axis adjusting reflecting optical systems 2, 5, 6, the expander 7, the polygonal rotatable mirror 8, the motor 11, the optical elements including the $f - \theta$ lens 9, etc. is in the form of box-shaped members integrally combined together, as shown, and may be made light in weight by using aluminum casting as the material therefor or by using thick plates of aluminum. Moreover, the box-shaped hollow construction of the carriage can minimize deformation such as twist, distortion or the like.

The laser oscillator 1 is mounted in the recess 19a of the carriage 19 and a front plate 20 is used to seal and shield the interior of the carriage against light. Since the He-Ne laser oscillator employed in the present embodiment is bulky and has a length approximate to the width of the body of the printing section, the depth L' of the carriage can be made equal to the depth L of the printing section body 21 determined by the length of the recording drum 4, by disposing the laser oscillator 1 below the rotary shaft of the recording drum 4.

The reflecting optical system 2 is mounted in the recess 19b of the carriage 19, the modulator 3 in the recess 19c, the reflecting optical system 5 in the recess 19d, and the reflecting optical system 6 in the surface portion 19e. A plate portion 22 vertically standing on the surface portion 19e is provided with a mount portion or hole 22a on which the expander 7 is mounted. A plate 23 horizontally disposed on the surface portion 19e provides the mounting bed for the polygonal rotatable mirror driving motor 11 and secured to the surface portion 19e after the inclination of the plate 23 is adjusted by means of four screws 23a.

A surface portion 19f is provided with a mount portion 24 on which the $f - \theta$ lens 9 is mounted. The recesses 19b – 19d and the surface portions 19e, 19f are sealingly covered and shielded against light by a side cover 25.

A surface portion 19g is formed with holes $19g_1$, $19g_2$, $19g_3$, $19g_4$ which respectively receive the legs $21a_1$, $21a_2$, $21a_3$, $21a_4$ of the printing section to thereby join the printing section 21 to the optical element carriage 19.

Since the legs $21a_1 - 21a_4$ can have their extent of projection from the section 21 varied by means of screws, the inclination of the section 21 and the carriage 19 may be adjusted by adjusting the lengths of the legs $21a_1 - 21a_4$. Screws are not the only means for adjusting the lengths of the legs but the relative inclination of the section 21 and the carriage 19 may also be adjusted by interposing spacers (not shown) between the section 21 and the carriage 19.

The construction of the image information recording apparatus according to the present invention as described above has the following features:

1. The separate formation of the printing section and the optical element forming section permits various types of printing sections and various types of the optical element forming sections to be combined or interchanged.

2. The laser oscillator being disposed below the center axis of the recording drum within the printing section makes it easy to construct the optical element mounting carriage as an independent portion.

3. The optical element mounting carriage in the form of a basically L-shaped box-like structure consisting of horizontal surface portions and vertical surface portions suffers little from deformation such as twist, distortion or the like and this is desirable for the mounting base for the optical elements.

4. The utilization of the box-shaped recesses formed circumferentially of the carriage to mount the various optical elements enables the adjustment and interchange of the optical elements to be more easily done from the side of the carriage. Also, the various optical elements can be simply sealed and shielded against light by use of the side cover 25.

5. The basically L-shaped construction of the carriage consisting of the horizontal and the vertical surface portions permits a longer light path to be provided without the apparatus requiring a large floor space.

6. The laser oscillator being located below the center axis of the recording drum within the printing section means that, even if the laser is of a large size, the entire apparatus can be made compact with its floor space minimized.

OPTICAL AXIS ADJUST MEANS

The optical element carriage 19 has the mounting spaces for various optical elements separated by wall portions K1, K2, K3 and surface portions 19e, 19f. The wall and surface portions are respectively formed with holes H1, H2, H3, H4 and expander mounting portion 22a.

The positions of the centers of the holes are mechanically determined so as to optically lie along a straight line.

The mounting of the laser oscillator 1 is effected by adjusting the mounted position thereof so that the laser beam emerging from the laser oscillator 1 passes through the center of the hole H1 and then securing the laser oscillator to the carriage 19.

Figure 4:
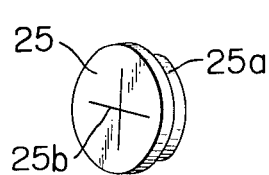
FIGS. 4 and 5 show an embodiment of the optical axis adjust means used in the present invention.
Figure 5:
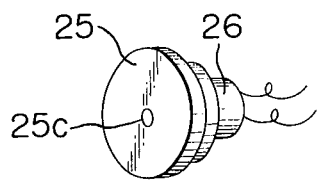

Subsequently, the reflecting optical element 2 is adjusted so that the laser beam may pass through the center of the hole H2. Next, the mounting of the modulator 3 is effected by adjusting the mounted position thereof so that the laser beam leaving the center of the hole H2 may pass to the input opening of the modulator 3 while the primary wave output from the modulator 3 passes through the center of the hole H3, and then securing the modulator 3 to the carriage. The reflecting optical element 5 is adjusted so that the laser beam emerging from the center of the hole H3 passes through the center of the hole H4. Next, the reflecting optical element 6 is adjusted so that the laser beam emerging from the center of the hole H4 passes through the center of the hole 22a. Highly accurate adjustment of the optical axis can be accomplished by matching the diameter of the holes H1 - H2 with the diameter of the laser beam, but if the diameter of the laser beam is variable, highly accurate adjustment of the optical axis may be accomplished by increasing the diameter of those holes so that caps 25 each provided with a stepped portion 25a as shown in FIG. 4 may be fitted into the holes H1 - H4 and 22a and then aligning the laser beam with a target 25b formed on the surface of each cap 25. Also, as shown in FIG. 5, a small through-aperture 25c may be formed centrally of each cap 25 and a photodetector 26 may be disposed behind the small aperture 25c to permit the cap 25 to be fitted into each of the holes H1 - H4 and 23a. When the laser beam is applied to the face of the cap 25 and at the center thereof, the output of the photodetector 26 will become maximum and such output may be detected by utilization of conventional means such as an electric meter or the like, thereby enabling the position of the laser beam to be known without resorting to visual detection.

The optical element carriage as shown in the embodiment of the present invention is highly advantageous in that the walls positioned on opposite sides of each optical element due to the structural characteristic of the carriage can be utilized to provide reference holes for the adjustment of the optical axis, whereas in the case of an ordinary optical element carriage constructed in a flattened form, an effect similar to that of the present embodiment will be provided only by vertically disposing partition-like plates individually on the opposite sides of each optical element and providing these plates with reference holes for the adjustment of the optical axis.

The features of the optical axis adjustment means described in the present embodiment are as follows:

1. The adjustment of the optical axis can be carried out with ease and accuracy because the long optical axis is divided into a plurality of light path sections and each optical element and optical axis adjustment target is designed so as to enable the adjustment of the optical axis in each light path section.

2. Any error of the optical axis resulting from one cause or another can be quickly detected by examining each light path section by the use of the target and can then quickly be corrected.

3. During interchange of optical elements, the re-alignment can be confirmed with ease.

Description will now be made of means for removing non-parallel components of the laser beam by the use of the above-described optical axis adjustment means.

The laser is a continuous wave of good coherence and therefore has a very sharp directivity. For example, if the diameter of the output beam at the outlet of an oscillator of He-Ne gas laser ($\lambda = 0.6328\ \mu$) is 1 mm, then $\theta \approx 6.3 \times 10^{-4}$ radians. Even if the laser beam travels over 100 meters, the diameter would only enlarge to 6.3 cm. In the embodiment of the present invention, however, if a spot of 0.1 mm or less in diameter is to be imaged on a recording means about 1 meter away, the resolution of the spot image will be the problem. According to the present invention, this problem is solved by utilizing the holes H1 – H4 in the optical axis adjustment means to remove non-parallel components of the laser beam.

Figure 6:
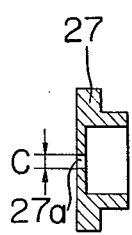
FIG. 6 shows an embodiment of means for removing non-parallel components of the laser beam.

More specifically, a stop opening 27a having a necessary diameter C is formed centrally of a cap 27 having a cross-section as shown in FIG. 6, and a required number of such caps 27 are securely fitted into the optical axis adjust holes H1 – H4 to thereby enable the non-parallel components of the laser beam to be removed by the stop opening 27a, thus improving the resolution of the recorded or reproduced image. Of course, the holes H1 – H4 themselves may be formed as stop openings 27a or if required, one or more partition-like plates may be vertically disposed between adjacent ones of the various optical elements and stop opening portions corresponding to the stop openings 27a may be provided in the surfaces of such plates. Obviously, the stop openings 27a may be used with the optical axis adjust means to serve also as targets 25b, 25c.

SAFEGUARD AGAINST LASER BEAM

Figure 7A:
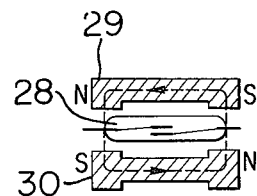
FIGS. 7, consisting of 7A & 7B, and 8 show embodiments of means for detecting the opening-closing of the apparatus door to ensure safety and the control circuit therefor.
Figure 7B:
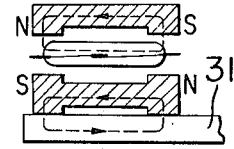
Figure 3:
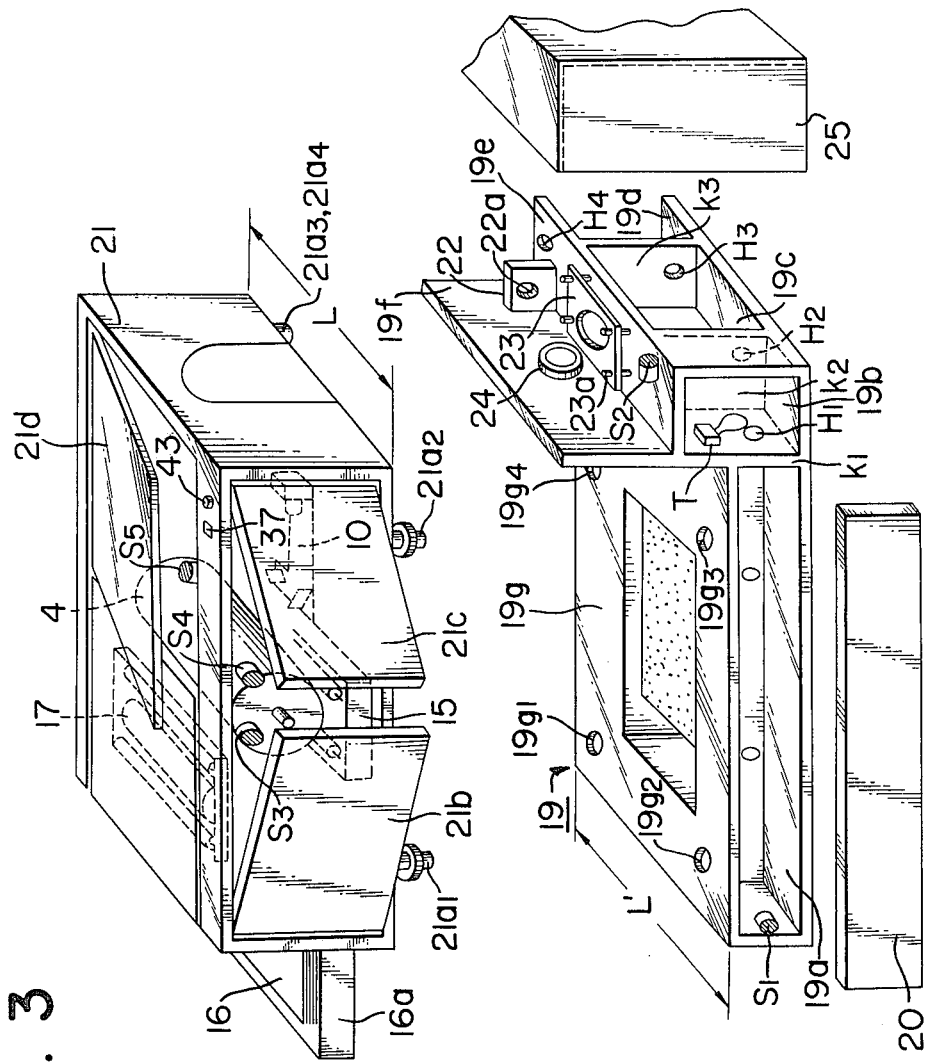
FIG. 3 is an exploded view showing the mechanical construction of the same embodiment.
Figure 8:
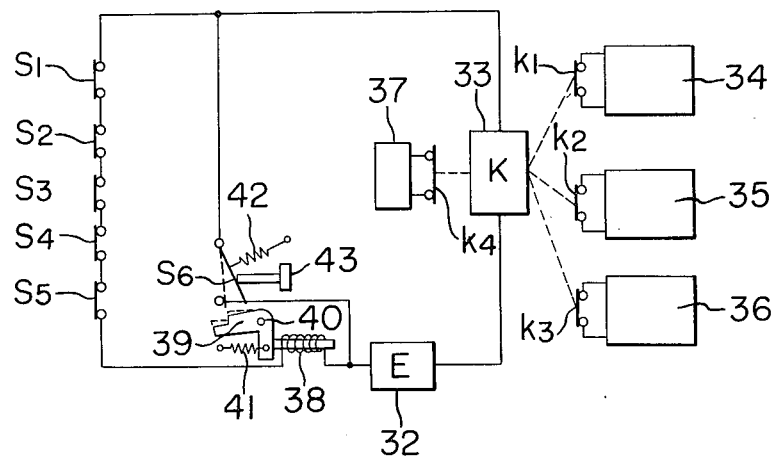

Reference will now be had to FIGS. 3, 7 and 8 to describe means for preventing the laser beam from flying outwardly when a portion of the apparatus according to the embodiment of the present invention is inadvertently opened.

The portion of the optical element carriage 19 which forms the light path of the laser beam is sealed and shielded against outside light by being covered with the front plate 20 and the side cover 25. The outer surface of the printing section 21 includes a front door 21b, 21c which may be opened to permit interchange of the recording drum and access to the developing device 15. A top plate 21d may also be opened to permit adjustment of the interior of the printing section. These outer cover portions need not be opened during the use of the present apparatus but, if they were opened by mistake, the laser beam might deviate from the optical axis for some reason or other and fly outwardly to adversely affect the human body, especially the eyes.

To eliminate the above-noted danger, the apparatus of the present invention employs a plurality of means for generating signals in response to the opening-closing of the cover portions which cover the light path of the laser beam, and means for causing a shutter T disposed in the light path to be closed to intercept the laser beam as soon as a control circuit responsive to the opening signals generated by said signal generating means when one of the portions covering the light path is partly opened cuts off the power supply to the driving power source for the laser oscillator. There is also provided means whereby the beam modulation output of the modulator 3 may be stopped or attenuated. It is also effective to use the aforesaid opening signals to insert an ND filter into the light path.

Opening-closing signal generating switches S1 – S5 are provided which correspond to those portions covering the laser beam path, namely, the front cover 20, the side cover 25, the front door 21b, 21c and the top plate 21d.

FIGS. 7(A) and (B) are cross-sectional views showing an embodiment of the opening-closing signal generating means. Designated by 29 and 30 are permanent magnets, and a reed switch is denoted by 28.

FIGS. 7(A) refers to the case where the front plate or door is opened and in this case, the reed switch 28 is in OFF position because the magnetic circuit provided by the permanent magnets 29 and 30 is in the condition as indicated by dotted line and arrows.

FIG. 7(B) refers to the case where the front plate or door is closed and in this case, the reed switch 28 is in ON position because the magnetic circuit is divided into two loops as indicated by dotted line and arrows when the front plate or door 31 formed of magnetic material is in proximity or intimate contact with the magnet 30.

The permanent magnet 30 acts as the so-called magnet catcher for maintaining the front plate or door in closed position.

The opening-closing signal generating means may be common mechanical electrical contacts.

FIG. 8 is a circuit diagram illustrating the control circuit responsive to the opening-closing signal generating means.

The switches S1 – S5 as the opening-closing signal generating means, relay means 33 and electromagnetic means 38 are connected in series with the power source 32. When at least one of the switches S1 – S5 is opened in response to the opening of the front plate or door, the power supply to the relay means 33 is cut off to change over the mode of the relay means.

In response to the change-over of the relay means 33, the main switch k1 for laser oscillator driver means 34, the driving switch k2 for light-intercepting shutter control means 35 and the output control stopping switch k3 for laser beam modulator control means 36 are opened or closed so that the laser oscillator 1 stops emitting the laser beam in response to the opening movement of the front plate or door while the light-intercepting shutter T shuts off the laser beam path and the modulator 3 stops its laser beam modulation output operation.

Said means for stopping or cutting off the emission of the laser beam may be used as a single means or a combination of a plurality of means, as required.

Designated by 37 is an indicator means for indicating with the aid of lamps or the like whether or not the laser beam is being emitted into its light path. The indicator means is such that a red lamp or the like is turned on when the laser beam is being emitted into its light path by the switch k4 responsive to the relay means 33 and that a blue lamp or the like is turned on when no laser beam is being emitted.

When the operator of the apparatus wants to effect, for example, an adjustment of the optical axis by opening the front plate or door, the laser beam must be emitted into the light path with the front plate or door left open. When a switch button 43 is depressed against a spring 42 with the front plate or door in open condition, a switch S6 is closed. Since any one of the switches S1 – S5 is in open position, no current flows to the electromagnet 38 so that a crank lever 39 is liberated from the attraction of the electromagnet 38 and rotated clockwisely about a pivot 40 by the force of a spring 41 to assume a position as indicated by dotted line.

The tip end of the switch S6 drops into a cut-away portion formed in one end of the crank lever 39, to thereby prevent the switch from being returned by the spring 42 and maintain the switch S6 in ON position, so that the current flows to plunger means 33 to maintain the mode of emitting the laser beam into the light path. When the keeper again closes the front plate or door, the current flows to the electromagnet 38 which thus attracts the crank lever 39, which in turn rotates counter-clockwisely about the pivot 40 so that the engagement between the tip end of the switch S6 and the forward cut-away portion of the crank lever 39 is broken away to permit the switch S6 to be returned to its OFF position by the spring 42.

If the motor 11 driving the polygonal rotatable mirror 8 shown in FIG. 1 stops rotating for one reason or another, then the laser beam reflected from the polygonal rotatable mirror 8 will not scan over the sensitive medium but will concentrate at one point thereon.

With such a concentration of the laser beam at one point, the sensitive medium might be seriously damaged. To overcome this drawback, the present invention provides means for detecting deenergization of the motor 11 driving the polygonal rotatable mirror 8, and means for stopping the reflection of the laser beam from the polygonal rotatable mirror 8 in response to a deenergization signal put out from the detector means.

The means for detecting the deenergization of the motor 11 and for stopping the emergence of the laser beam from the polygonal rotatable mirror will now be explained with respect to some embodiments thereof.

Figure 9:
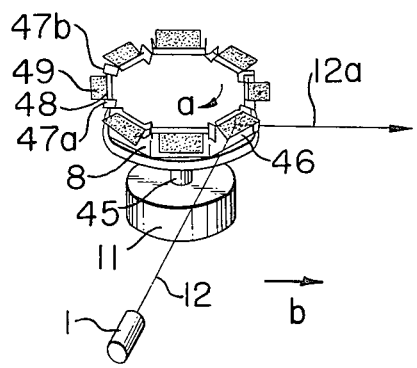
FIGS. 9-11, FIG. 12 consisting of 12A through 12C, and FIG. 13 show an embodiment of means for ensuring safety during accidental stoppage of a polygonal rotatable mirror.

FIG. 9 is a perspective representation of a first embodiment. The deflector comprises a polygonal rotatable mirror 8 having a number of mirror surfaces disposed circumferentially thereof and mounted on the rotary shaft 45 of the motor 11 and is designed such that the laser beam 12 is caused to impinge from the laser oscillator 1 upon the peripheral portion of the polygonal rotatable mirror 8 while the motor 11 is rapidly rotated in the direction of arrow a, whereby the reflected beams 12a from successive ones of the mirror surfaces 46 are deflected in the direction of arrow b. Bearings 47a and 47b are disposed on the top surface of the polygonal rotatable mirror 8 in corresponding relationship with each of the mirror surfaces 46 of the deflector, and light intercepting plates 49 each having a shaft 48 are pivotally mounted by means of the bearings. The surface of each of the light intercepting plates 49 is treated for low reflection and during the inoperative condition of the motor 44, the dousers are downwardly depending due to gravity or spring action (not shown) so as to cover the mirror surfaces 46 and intercept the laser beam 12. When the motor attains a prescribed number of revolutions, the light intercepting plates 49 jump up due to centrifugal force and thereby expose the mirror to permit reflection of the laser beam.

Figure 10:
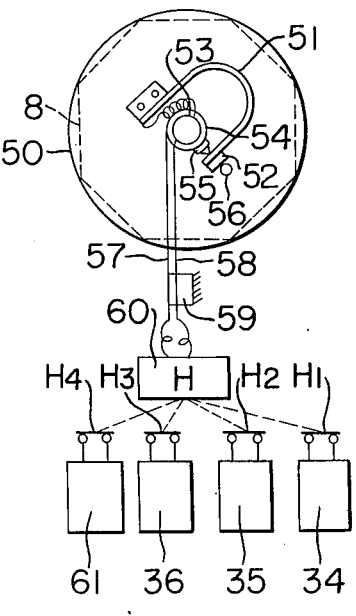

A second embodiment will now be explained by reference to FIG. 10. Reference numeral 8 designates the polygonal rotatable mirror and reference numeral 50 denotes a disc mounted on the rotary shaft of the motor 11. A U-shaped spring plate 51 is secured at one end to the disc 50. A weight 52 is attached to the other end of the U-shaped spring plate 51. Slip rings 53 and 54 are provided on the rotary shaft of the motor. The slip ring 54, a contact 55 and a contact arm 57 together constitute one segments of an electric circuit, and one end of the U-shaped spring plate 51, the slip ring 53 and a contact arm 58 together constitute the other segment of an electric circuit. The contact arms 57 and 58 are secured to a bed 59.

During the inoperative condition of the motor, that end of the U-shaped spring plate 51 to which the weight 52 is attached is biased to contract toward the center of rotation so that the U-shaped spring plate 51 engages the contact 55 to thereby provide conduction between the contact arms 57 and 58. When the motor attains a prescribed number of revolutions, a circumferentially directed force resulting from centrifugal force acts on the weight 52 so that the U-shaped spring plate 51 is disengaged from the contact 55 to thereby cut off contact between the contact arms 57 and 58. A pin 56 is provided to limit the movement of the weight 52.

When the motor is stopped from rotating, conduction occurs between the contact arms 57 and 58 as described above, so that the mode of relay means 60 is changed over in response to the conduction signal.

Since the main switch H1 for laser oscillator driver means 34, the control switch H2 for light-intercepting shutter control means 35 disposed in the path of the laser beam and the output control stop switch H3 for laser beam modulator control means 36 are opened or closed in response to the change-over of the relay means 60, the laser oscillator 1 shown in FIG. 1 stops emitting the laser beam or the light-intercepting shutter T shuts off the laser beam path or the modulator 3 stops putting out the laser beam modulation output.

Motor rotative condition indicator means 61 serves to indicate the condition of the motor rotation with the aid of a lamp or similar means upon closing and opening of the switch H4 which is responsive to relay 60.

The means for stopping or intercepting the emergence of a plurality of laser beams may be used as a single means or a combination of plural means, as required.

Figure 11:
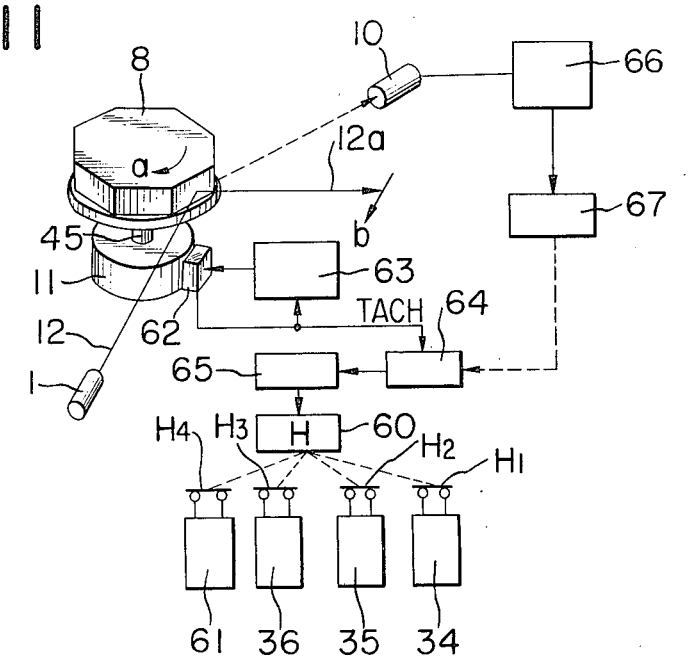
Figure 12:
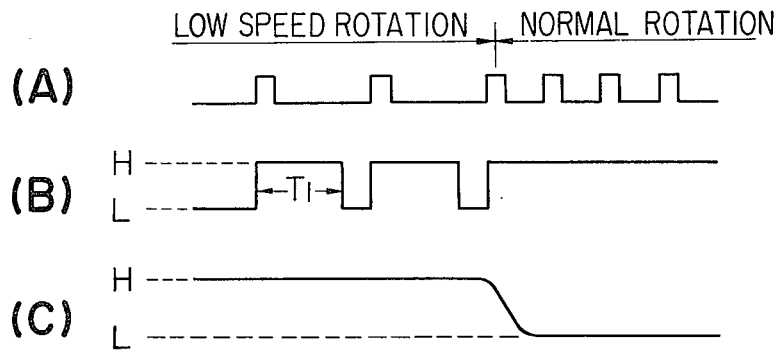

Reference will now be had to FIGS. 11 and 12 to describe a third embodiment. The polygonal rotatable mirror 8 mounted on the rotary shaft of the motor 11 scans the laser beam 12 put out from the laser oscillator 1, at a predetermined angular speed and under the control of a servo-control circuit 63 for controlling the rotative drive of the motor 11. The servo-control circuit 63 receives a rotation signal from a head 62 provided on the motor 11 (hereinafter referred to as TACH signal) and compares such signal with a reference rotation signal contained in the servo-control circuit 63 (for example, the comparison is done by rectifying the rotation signal pulse, taking it out in the form of a voltage, and comparing the rotation signal voltage with the reference voltage), and if there is any difference between the two signals, the servo-control circuit sends a correction signal to the motor 11 to control it so as to rotate at a predetermined angular speed.

The above-mentioned TACH signal is applied as input to a resettable monostable multivibrator circuit 64, the output from which is passed through a bypass circuit 65, whereby a zero potential signal is provided when the motor 11 is rotating at the predetermined angular speed but a predetermined potential signal is provided when the speed slows down.

FIG. 12(A) shows the pulse periods of the TACH signal during normal rotation and during low speed rotation, respectively. FIG. 12(B) illustrates the output waveform when the resettable monostable multivibrator circuit 64 is triggered by the TACH signal shown in FIG. 12(A). FIG. 12(C) shows the output waveform provided by the output from the monostable multivibrator circuit 64 when it is passed through the bypass circuit 65.

During normal rotation, the TACH pulse period is shorter than the width T1 of the single pulse from the monostable multivibrator 64 and thus, no reset occurs and the output from the monostable multivibrator 64 assumes the form of direct current.

On the other hand, during low speed rotation, the TACH pulse period is greater than the width T1 of the single pulse from the monostable multivibrator 64 and thus, reset occurs and the output from the monostable multivibrator 64 assumes the form of alternating current.

By the output from the monostable multivibrator 64 being passed through the bypass circuit 65, a zero potential is provided when said output is a direct current, namely, when the rotation is the normal rotation but a low speed rotation signal potential is provided when the output is an alternating current, namely, when the rotation is slowed down.

In accordance with the mode of the relay means 60 changed over in response to the low speed rotation signal potential, the main switch H1 for laser oscillator driver means 34, the control switch H2 for light-intercepting shutter control means 35, the output control switch H3 for modulator control means 36 and the control switch H4 for motor rotative condition indicator means 61 are changed over so that the laser oscillator 1 stops putting out the laser beam or the shutter T shuts off the laser beam path or the modulator 3 stops putting out its modulation output, whereby the entry of the laser beam into the light path is prevented.

A fourth embodiment will now be described by reference to FIGS. 11 and 12.

During each complete rotation of the polygonal rotatable mirror 8, laser beams 12a corresponding in number to the reflecting surfaces of the polygonal mirror 8 impinge upon the light-sensing element 10 of a beam position detector circuit 66 provided at the farthest end of the principal scanning light path of the laser beam 12a. The beam position detector means 10, as will hereinafter be described, detects the leading end position of the laser beam 12a in the principal scanning light path and triggers a writing signal into the modulator 3 (see FIG. 1), while in the beam position detector circuit 66 there is generated a scanning pulse having a frequency corresponding to "number of revolutions of the motor (per second) × number of the reflecting surfaces of the polygonal rotatable mirror."

The above-mentioned frequency of the scanning pulse is proportionate to the number of revolutions of the motor 11, but by using a frequency divider circuit 67 to reduce a frequency which is too high and by applying the scanning pulse signal to the monostable multivibrator circuit 64 as described in connection with the third embodiment, a DC output may be provided from the monostable multivibrator circuit 64 when the motor is making normal rotation but an AC output may be provided when the number of revolutions of the motor 11 is decreased.

Thereafter, the emergence of the laser beam 12a may be stopped by similar technical means whenever the number of revolutions of the motor 11 is decreased.

The third and fourth embodiments are superior to the first and second embodiments in that no additional means need be provided as the means for generating signals upon a decrease in the number of revolutions of the polygonal rotatable mirror 8 and for stoppage of the mirror. In the third and fourth embodiments, the circuit means for detecting the rotation signal put out from the head 62 or the scanning pulse signal put out from the beam position detector circuit 66 to effect an appropriate treatment is not restricted to the examples shown there. For example, the technical means as shown in FIG. 13 will also occur to mind.

Figure 13:
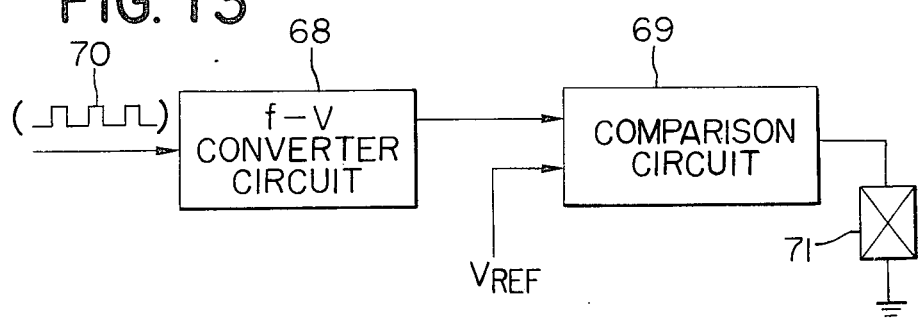

In FIG. 13, the aforementioned rotation signal pulse or scanning pulse signal 70 enters an $f$-$V$ converter circuit 68. A voltage dependent on the frequency of the rotation signal pulse or scanning pulse put out from the $f$-$V$ converter circuit 68 is applied to one input terminal of a comparison circuit 69 and a reference voltage is applied to the other input terminal of the comparison circuit 69, whereby any decrease in the number of revolutions of the motor may be detected and the low speed rotation signal from the comparison circuit 69 may be delivered to relay means 71, which may thus control a group of switches to stop the emergence of the laser beam into its light path.

Figure 14A:
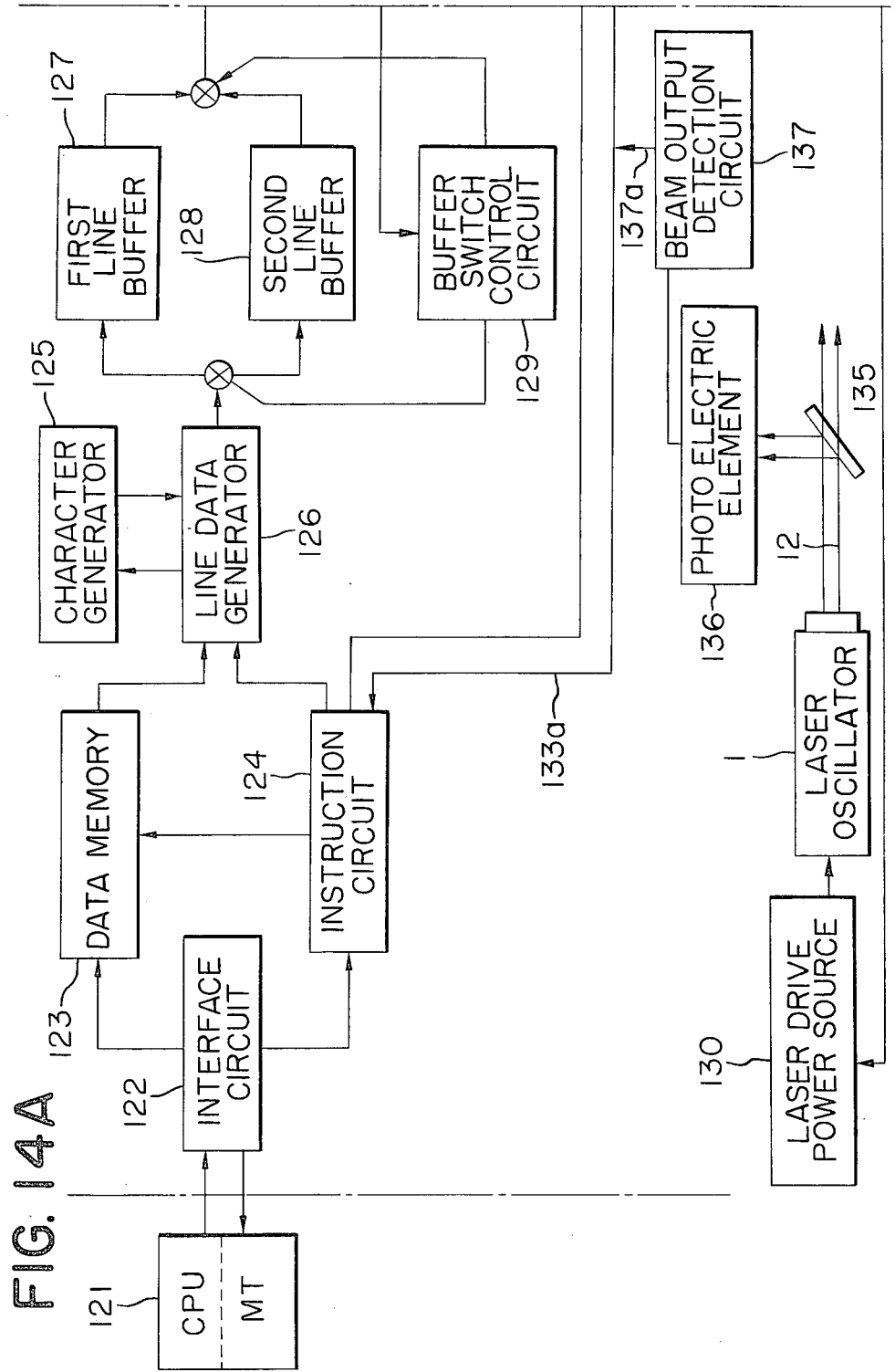
FIG. 14 (including FIGS. 14A and B) is a block diagram showing the control of the operation of the entire apparatus according to an embodiment of the present invention.

Reference will now be had to FIG. 14 to describe the process of operation from the reception of pattern or character information from a computer till the production of the desired hard copy effected with the aid of the apparatus shown in the present embodiment. The information from a computer 121 is applied in a predetermined format to the interface circuit 122 of the apparatus either directly or through the intermediary of a memory medium such as a magnetic tape or disc. Various instructions from the computer are decoded and executed by an instruction circuit 124. The data is stored in a data memory 123 in a predetermined quantity. The data may be imparted in the form of binary code in the cases where it is character information, and the data may be in the form of picture elements or lines forming a pattern (the so-called vector data) in the cases where the data is pattern information. These modes are designated prior to the data and in accordance with the designated mode, the instruction circuit 124 controls the data memory 123 and a line data generator 126 to process the data. The line data generator 126 generates the final data for one scanning line.

When the data is imparted in the form of a character code, either character patterns are read out from a character generator 125 and character patterns for one print line are buffered in juxtaposed relationship or character codes for one print line are buffered and character patterns are successively read out from the character generator 125 to thereby prepare successive data for modulating the laser light corresponding to one scanning line. Where the data is pattern information, the data is also converted into scanning line data to prepare successive data for modulating the laser light corresponding to one scanning line. The data for one scanning line alternately applied, under the control of a buffer switch control circuit 129, to a first 127 and a second line buffer 128 each of which comprises a shift register or the like having a number of bits equal to the number of picture elements for one scanning line.

Further, the data in the first 127 and the second line buffer 128 are successively read out for each bit of one scanning line with the beam detector signal from a beam detector 132 as the trigger signal, and then imparted to a modulator control circuit 131. During the time one reflecting surface scans over the photosensitive drum along a line perpendicular to the direction of rotation thereof, the data for one scanning line stored in the line buffers are imparted to the modulator 3, thus imparting a light-and-dark pattern for one scanning line to the photosensitive drum 8. From the first and second line buffers 127 and 128, the data is alternately read out under the control of the buffer switch control circuit 129. The time relations therebetween are shown in FIG. 15. As will be seen, when reading is being effected from one of the line buffers, writing is being effected into the other line buffer. By such system, all the data without exception can be imparted to the modulator even if the interval from one reflecting surface to the next one of the polygonal rotatable mirror 8 scanning over the photosensitive drum 4 is extremely short. During the time one scanning line is scanned, the photosensitive drum 4 continues its constant speed rotation and moves over a suitable scanning line interval.

Upon reception of a start instruction from the instruction circuit 124, a printer control circuit 133 starts to operate the printer and returns a printer ready signal 133a, laser ready signal 137a and scanning ready signal 138a to the instruction circuit 124. As soon as signals are written in the modulator 3 and the data for one page is written on the photosensitive drum, a sheet of plain recording paper 16 is fed by a paper feed mechanism 16a with such a timing that the written data may be transferred just to the head of that page at the transfer station.

In this manner, the character or pattern information from the computer 121 is output as a clear hard copy on the plain paper.

The aforementioned laser ready signal may be provided by splitting the laser beam 12 from the laser oscillator 1 with the aid of an optical splitter 135 disposed in the light path, causing the split laser beam to impinge upon a photoelectric element 136, and detecting the output of the photoelectric element 136 by means of a detector circuit 137.

More specifically, when the intensity of the laser beam emitted from the laser oscillator exceeds a predetermined level, the beam output detector circuit 137 detects that the output of the photoelectric element 136 exceeds a reference level, whereupon it generates the laser ready signal 137a. As another means for detecting the output intensity of the laser beam, there is a method of detecting a voltage provided as the crest value of the output pulse from the beam detector 132 (in FIG. 1, indicated by 10). The laser beam incident on the beam detector 132 is such that said crest value is proportionate to the output from the laser oscillator 1 because the amplitude voltage put out from the modulator control circuit 131 is constant and moreover, it is put out when there is no modulating information input.

The beam detector 132 detects that the intensity of the laser beam detected exceeds the reference level, and thus generates the laser ready signal 132a.

On the other hand, the scanning ready signal 138a as the normal rotation ready signal for the polygonal rotatable mirror 8 is generated from rotation number detector means 138 which detects the normal rotation operation of the motor 11 by the use of the technical means described in connection with FIGS. 10 – 13.

Next, description will be made of means for making constant the laser beam output from the modulator 3 by applying to the modulator control circuit 131 the voltage output signal for the laser beam intensity provided as the crest value of the output pulse from the beam detector 132.

Where the modulator 3 is, for example, an acousto-optic modulator element, the degree of deflection will be varied if the frequency of the input signal to the modulator 3 is varied and the output intensity will be varied if the amplitude is varied. Thus, the laser beam is modulated by varying the amplitude in accordance with an information signal. Also, the output level is varied by varying the amplitude voltage. Thus, the signal provided as the crest value of the output pulse from the beam detector 132 is a voltage signal as the laser beam input intensity and by such signal, the amplitude entered into the modulator 3 as the output of the modulator control circuit 131 is controlled to thereby make constant the output level of the laser beam from the modulator 3.

The wiring and connections in the control circuit, the driver circuit, the detector circuit or other circuit in each section will now be explained with reference to FIG. 1.

From the printer control circuit 133 included in the printing section 21, control signals are delivered through flexible printed plates P1 and P2, which form a number of transmission lines, to the mechanical and electrical elements forming the printing section 21. The flexible printed plates are connected to the control circuit 133 by connectors J1 and J2. The printed plates, which are of small thickness, may be provided along the side and bottom surfaces by utilization of very thin clearances in the printing section to thereby permit maximum utilization of the dead space of the printing section 21 and thus permit a very compact construction thereof.

The signal from the beam position detector 10 is introduced into the printed plate P2 through a flexible printed plate P3 and a connector J3.

The control signal from the modulator control circuit 131 to the modulator 3 included in the optical element carriage 19 is delivered through flexible printed plates P4, P5, P6, P7 and connectors J5, J6, J7.

The control signal from the motor control circuit 134 to the motor 11 for driving the polygonal rotatable mirror 8 is delivered through flexible printed plates P4, P5, P7 and connectors J5, J7. Since the utilization of the printed plates leads to the maximum utilization of the very thin clearances in the side and bottom surfaces of the optical element carriage 19, this carriage 19 can also be made very compact.

A rack carriage 100 incorporates therein not only the modulator control circuit 131 and the motor control circuit 134 but also the laser driving power source 130, the first line buffer 127, the second line buffer 128, the buffer switch control circuit, etc., but a number of transmission lines can be provided within a limited space and the connections between the circuits can be complete by providing the flexible printed plates along the side and bottom surfaces of the rack carriage 100.

As has hitherto been described in detail, the present invention provides an image information recording apparatus which can rapidly produce hard copies of sharp and high contrast and is remarkable in performance, stability and safety, as compared with the prior art apparatus, as the result of a unique combination of various excellent mechanical, electrical and optical arrangements, various excellent laser beam exposure means and control means, and a very excellent electrophotographic method.

We claim:

1. In an image information recording apparatus comprising, a laser beam forming means for forming a laser beam modulated in accordance with an image information signal, optical means for focussing the modulated laser beam on a recording medium, an optical scanner for scanning the modulated laser beam, and a frame structure for placing therein said laser beam forming means, said optical means and said optical scanner, the improvement comprising:

optical axis detecting means mounted at a position to receive the laser beam and to detect deviation from a predetermined optical axis passing through the position at which said detecting means is mounted of the actual optical axis passing therethrough after said laser beam forming means, said optical means and said optical scanner are mounted in the frame structure, to thereby facilitate fine adjustment of the actual optical path of the laser beam.

2. The improvement as claimed in claim 1, wherein said frame structure has integrally formed walls defining spaces therebetween, said walls being provided with holes therethrough and wherein said detecting means comprises a cap insertable into at least one of said holes in said walls, and having, on the front face thereof, a target representing the predetermined optical axis.

3. The improvement as claimed in claim 1, wherein said frame structure has integrally formed walls defining spaces therebetween, said walls being provided with holes therethrough and wherein said detecting means comprises a cap insertable into at least one of said holes in said walls, and having an aperture of a small diameter at a portion of the front face thereof corresponding to the predetermined optical axis, and a photoelectric member sensitive to the laser beam passed through the aperture on the back face thereof, whereby adjustment of the actual optical axis can be accomplished by the output of said photoelectric member.

4. The improvement as claimed in claim 1, wherein said frame structure has integrally formed walls defining spaces therebetween, said walls being provided with holes therethrough and further comprising:
- a housing to cover said spaces;
- signal means to generate a signal in response to the opening and closing of a part of said housing; and
- means responsive to the opening signal of said signal means to interrupt or attenuate projection of the laser light beam, and responsive to the closing signal of said signal means to release the interruption or attenuation of projection of the laser beam.

5. The improvement as claimed in claim 4, wherein said means for interrupting or attenuating projection of the laser beam comprises a power source control means for said laser beam forming means.

6. The improvement as claimed in claim 4, wherein said means for interrupting or attenuating projection of the laser light beam comprises means for controlling beam modulation by said beam forming means.

7. The improvement as claimed in claim 4, wherein said means for interrupting or attenuating projection of the laser beam is a shutter disposed along the optical axis.

8. The improvement as claimed in claim 1, further comprising:
- means for detecting a deviation in the scanning speed of said scanning means from a predetermined speed; and
- means for interrupting or attenuating projection of the laser beam in response to the signal from said detecting means.

9. The improvement as claimed in claim 8, wherein said means for interrupting or attenuating projection of the laser beam comprises a power source control means for said light beam forming means.

10. The improvement as claimed in claim 8, wherein said means for interrupting or attenuating projection of the laser beam comprises means for controlling beam modulation by said beam forming means.

11. The improvement as claimed in claim 8, wherein said means for interrupting or attenuating projection of the laser beam is a shutter disposed along the optical axis.

12. The improvement as claimed in claim 1, further comprising:
- means for detecting whether the laser beam from said laser beam forming means has a predetermined output intensity, whereby the recording operation is carried out when said predetermined level of output is reached.

13. The improvement as claimed in claim 12, further comprising means for indicating when said predetermined output intensity has been established.

14. The improvement as claimed in claim 1, wherein said laser beam forming means includes a laser beam generator and a modulator for modulating the laser beam from said generator, and further comprising: means for detecting whether the laser beam from said laser beam generator has a predetermined output intensity, whereby the recording operation is carried out when said predetermined level of output is reached.

15. In a laser beam handling apparatus comprising a mounting base having mounting walls for mounting a laser beam forming means for forming a laser beam modulated in accordance with an image information signal, a scanner for scanning the laser beam, a focussing optical system for the laser beam and an optical mirror for the laser beam, the improvement comprising:
- partition walls associated with said mounting base for dividing the optical path for the laser beam produced from said laser forming means, the partition walls being formed with holes to permit passage of the laser beam at positions where the optical path crosses the partition walls; and
- optical axis detecting means attachable to at least one of said holes for detecting deviation from a predetermined optical axis passing through the hole to which said detecting means is attached of the actual optical axis passing therethrough after said laser forming means, scanner, focussing optical system and optical mirror are mounted on said mounting walls.

16. The improvement as claimed in claim 15, wherein said detecting means comprises a mating member which is mountable into the hole in each of the partition walls to detect the position of the laser beam incident on the mating member.

17. The improvement as claimed in claim 16, wherein said mating member is provided with an aperture of a small diameter at the position corresponding to the center of the optical axis which is designed to be the center of the holes in said partition walls.

18. The improvement as claimed in claim 17, wherein said detecting means further comprises a photoelectric member sensitive to the laser beam, whereby adjustment of the optical axis can be accomplished using the output of the photoelectric member.

19. The improvement as claimed in claim 16, wherein said mating member is provided with a target representing the center of the optical axis.

* * * * *